United States Patent
Nakata et al.

(10) Patent No.: US 6,656,494 B1
(45) Date of Patent: Dec. 2, 2003

(54) METHOD OF FEEDING REPRODUCTIVE FEMALE PIGS AND FEEDS FOR REPRODUCTIVE FEMALE PIGS

(75) Inventors: Masahide Nakata, Hyogo (JP); Mampei Kobayashi, Kanagawa (JP); Masahiko Fukayama, Kobe (JP)

(73) Assignee: Agromedic Co., Ltd., Tokyo (JP)

( * ) Notice: Subject to any disclaimer, the term of this patent is extended or adjusted under 35 U.S.C. 154(b) by 0 days.

(21) Appl. No.: 09/913,739

(22) PCT Filed: Sep. 20, 2000

(86) PCT No.: PCT/JP00/06403

§ 371 (c)(1),
(2), (4) Date: Aug. 17, 2001

(87) PCT Pub. No.: WO01/28354

PCT Pub. Date: Apr. 26, 2001

(30) Foreign Application Priority Data

| Oct. 19, 1999 | (JP) | 11-296727 |
| Feb. 24, 2000 | (JP) | 2000-47728 |
| Mar. 15, 2000 | (JP) | 2000-71594 |

(51) Int. Cl.$^7$ .......... A23K 1/18; A01N 25/03; A61K 47/00
(52) U.S. Cl. ........ 424/442; 424/410; 424/439
(58) Field of Search .......... 424/180, 405, 424/410, 442

(56) References Cited

U.S. PATENT DOCUMENTS 4,496,547 A * 1/1985 Kawashima et al. .......... 514/25
5,110,592 A * 5/1992 Stitt .......... 424/195

FOREIGN PATENT DOCUMENTS

JP 5-252907 10/1993

OTHER PUBLICATIONS

Kojima et al (Dietary Administration of Fatty Acids—Enriched Mold Dried Cell Containing γ–Linolenic Acid to Female Pigs Improves Ovulation Rate and Embryo (Journal of Reproduction and Development; vol. 43, No. 2, 1997).*

R.W. Seerley, et al., "The influence of sow dietary lipids and choline on piglet survival, milk and carcass composition", Journal of Animal Science, vol. 52, No. 3, 1981, pp. 542–550.

K.A. Bowers, et al., Evaluating high oil corn for lactating sows, Journal of Animal Science, vol. 77, No. Suppl, 1, 1999, p. 182.

Database CAB Online, Walkiewicz, et al., "The influence of supplementary feeding of lactating sows with fish oil on the fat content of milk and on litter rearing outcome", vol. 13, 1995, pp. 71–76 (Abstract only).

Kojima T. et al., "Dietary Administration of Fatty Acids—Enriched Mold Dried Cell Containing γ–Linolenic Acid to Female Pigs Improves Ovulation Rate and Embryo Quality in Summer", *Journal of Reproduction and Development*, vol. 43(2), p. 121–127 (1997).

Patent Abstract of Japan, No. 5–252907, Oct. 5, 1993.
Patent Abstract of Japan, No. 4–271754, Sep. 28, 1992.
Patent Abstract of Japan, No. 2–227052, Sep. 10, 1990.
Patent Abstract of Japan, No. 4–320652, Nov. 11, 1992.
Patent Abstract of Japan, No. 7–8183, Jan. 13, 1995.

* cited by examiner

*Primary Examiner*—Thurman K. Page
*Assistant Examiner*—Micah-Paul Young
(74) *Attorney, Agent, or Firm*—Antonelli, Terry, Stout & Kraus, LLP

(57) ABSTRACT

Disclosed are a breeding method of a female pig for propagation characterized by feeding at least one lipid selected from a fatty acid having 12 to 24 carbon atoms which has a melting point falling in a range of –60 to 40° C. and an iodine value falling in a range of 30 to 470 and which has 2 to 6 double bonds in a molecule, a triglyceride containing the above fatty acid and a metal salt of the above fatty acid, and a feed for a female pig for propagation containing the above lipid in a proportion of 0.5 to 10% by weight in terms of the fatty acid described above.

According to the breeding method of a female pig for propagation of the present invention, breeding results can be elevated by further increasing a litter size, allowing the number of delactation to grow large, shortening the days of returning estrus and increasing an annual average delivery frequency.

10 Claims, No Drawings

METHOD OF FEEDING REPRODUCTIVE FEMALE PIGS AND FEEDS FOR REPRODUCTIVE FEMALE PIGS

TECHNICAL FIELD

The present invention relates to a breeding method of a female pig for propagation and a feed for a female pig for propagation. More specifically, the present invention relates to a breeding method of a female pig for propagation for elevating a propagation result of a pig by further increasing a litter size, elevating the number of delactation, shortening the days of returning estrtus and allowing an annual average delivery frequency to grow, and a feed for a female pig for propagation which is suitably used in this breeding method.

BACKGROUND ART

So-called lipids such as triglycerides and fatty acids are excellent particularly as an energy source among three essential nutrients and have so far widely been used for a feed for livestock (refer to, for example, [Animal Dietetics] H. Morimoto, Yokendo, 1987). Among them, triglyceride is not isolated in the form of triglyceride and fed in almost all cases in the form of a material itself containing a lot of triglycerides such as soybean, rapeseed, corn, cotton seed and rice bran or cakes containing triglycerides obtained after pressing oils from the above materials ([Japan Standard Feed Component Table] edited by an executive office of Fisheries Technology Conference in Ministry of Agriculture and Fisheries, Japan Livestock Industry Association, 1995). In recent years, fatty acids obtained by hydrolyzing this triglyceride, particularly hardened fatty acids such as beef tallow and palm oil tend to be used in many cases because of easiness in handling.

These triglycerides and fatty acids have been used blending with general mixed feeds for the purpose of efficiently supplying energy and have not been used for the purpose of improving a breeding efficiency paying attentions to a physiological activity of a specific fatty acid. With respect to this point, only evaluation of fat and oil raw materials and fats and oils as energy sources such as a digestible nutrient total amount and metabolizable energy is described in the Japan Standard Feed Component Table described above which is a leading standard book of livestock nutrient in our country.

On the other hand, fatty acid calcium salt which is one of lipids is a relatively new material which came to be first used as a feed in 1980s. This fatty acid calcium salt is widely used as a high energy feed for livestock such as high yielding dairy cows and others, particularly for supplying energy in a hot weather (refer to, for example, [Utilization Data of Fat and Oil to Cow Feed] The National Federation of Dairy Cooperative Associations, 1988). Further, known as other uses are a method in which this fatty acid calcium salt is used for supplying energy which is liable to be short when feeding mainly grass for a growth in rumen in breeding beef cattles, whereby a healthy growth in rumen and a good grown body are obtained ([Beef Cattle Journal, February issue, March issue, July issue, August issue and September issue] T. Terada, 1997), a method in which calcium salt of fatty acid contained in fish oil is fed to cattles and pigs to introduce eicosapentaenoic acid and docosahexaenoic acid into meats (Japanese Patent Application Laid-Open No. 289734/1996), a method in which calcium salt of fatty acid contained in linseed oil is fed to milking cows to introduce α-linolenic acid into milk ([Nicchiku Report] vol. 66, No. 10, p. 889 to 897, S. Ishida et al., 1995) and a method in which calcium salt of fatty acid contained in linseed oil is fed to egg breed chickens to introduce α-linolenic acid into eggs (Japanese Patent Application Laid-Open No. 315350/1994).

As described above, all of a triglyceride, a fatty acid and fatty acid calcium salt have so far widely been used as a raw material for a feed, and they have been used in almost all cases for the purpose of (1) growing a body and improving production of milk by efficiently supplying energy or (2) introducing some kinds of fatty acids into livestocks such as beef, milk, pork, chickens and eggs.

In recent years, attentions are paid to a physiological activity of unsaturated fatty acids such as linoleic acid, linolenic acid, eicosapentaenoic acid and docosahexaenoic acid as new uses of these lipids, and it is tried to make use of them for breeding of cattles ([Clinical Veterinary] vol. 14, No. 7, p. 33 to 39, M. Nishikai, 1996; Feetstuffs, Staples, C. R. et al., Jan. 12, 1998). Further, it is reported that these unsaturated fatty acids reduce a death rate of fertilized ovums, which results in elevating a fecundation rate of cattles (Thatcher, W. W. et al., J. Anim. Sci., 72 (Suppl. 3), p. 16 to 30, 1994).

As described above, researches regarding a relationship of a breeding result with triglycerides, fatty acids and derivatives thereof and applications thereof in breeding cattles have come to be carried out, but it is the existing situation that a relationship thereof with triglyceride, fatty acids and derivatives thereof in breeding pigs have not yet been researched. That is, as far as breeding of pigs is concerned, it has so far actively been tried to elevate an ability intrinsic to pigs by breeding based on a thremmatological method, and a litter size per head of a mother pig has come to reach, for example, 12 head/parturition on an average. However, it has not yet been tried to elevate a breeding result thereof from the viewpoints of nutrients such as feed components and physiologically active substances contained in feeds.

DISCLOSURE OF THE INVENTION

In light of the circumstances described above, an object of the present invention is to provide a breeding method of a female pig for propagation for elevating a breeding result of pigs by (1) increasing a litter size, (2) elevating the number of delactation, (3) shortening the days of returning estrus and (4) increasing an annual average delivery frequency. A second object thereof is to provide a feed for a female pig for propagation which is suitably used in this breeding method.

Thus, intensive researches repeated by the present inventors in order to achieve the objects described above have resulted in finding that the first object can be achieved by feeding a female pig for propagation with a lipid comprising a fatty acid having a prescribed carbon number in which a melting point and an iodine value each fall in a specific range and which has plural double bonds in a molecule and triglyceride and a metal salt thereof and that the second object can be achieved by a feed containing the lipid described above in a specific proportion. The present invention has completed based on such knowledge.

That is, the first object of the present invention can be achieved by a breeding method of a female pig for propagation characterized by feeding a feed comprising at least one lipid selected from a fatty acid having 12 to 24 carbon atoms which has a melting point falling in a range of −60 to 40° C. and an iodine value falling in a range of 30 to 470 and which has 2 to 6 double bonds in a molecule, a triglyceride containing the above fatty acid and a metal salt of the above fatty acid, particularly a feed containing a lipid comprising a metal salt of the above fatty acid and, if necessary, a triglyceride containing the above fatty acid.

Further, the second object thereof can be achieved by a feed for a female pig for propagation characterized by comprising at least one lipid selected from a fatty acid having 12 to 24 carbon atoms which has a melting point falling in a range of −60 to 40° C. and an iodine value falling in a range of 30 to 470 and which has 2 to 6 double bonds in a molecule, a triglyceride containing the above fatty acid and a metal salt of the above fatty acid in a proportion of 0.5 to 10% by weight in terms of the fatty acid described above.

BEST EMBODIMENT FOR CARRYING OUT THE INVENTION

In the breeding method of a female pig for propagation of the present invention (hereinafter referred to merely as [the breeding method of the present invention]), fed with a female pig for propagation is at least one lipid selected from an unsaturated fatty acid, a triglyceride containing the above fatty acid and a metal salt of the above fatty acid.

Used as the unsaturated fatty acid described above is a fatty acid having 12 to 24 carbon atoms which has a melting point falling in a range of −60 to 40° C., preferably −50 to 0° C. and an iodine value falling in a range of 30 to 470, preferably 150 to 470 and which has 2 to 6 double bonds in a molecule. Capable of being preferably given as such fatty acid is at least one selected from linoleic acid, linolenic acid, bishomo-γ-linolenic acid, arachidonic acid and eicosapentaenoic acid.

Shown in Table 1 are the carbon numbers, the double bond numbers, the melting points and the iodine values of the respective fatty acids.

TABLE 1

| Kind of fatty Acid | Carbon number | Number of double bond | Melting point (° C.) | Iodine value |
|---|---|---|---|---|
| Myristic acid | $C_{14}$ | 0 | 54.4 | 0 |
| Palmitic acid | $C_{16}$ | 0 | 62.9 | 0 |
| Palmitoleic Acid | $C_{16}$ | 1 | 0.5 | 99.8 |
| Stearic acid | $C_{18}$ | 0 | 69.6 | 0 |
| Oleic acid | $C_{18}$ | 1 | 13.4 | 89.9 |
| Linoleic acid | $C_{18}$ | 2 | −5.1 | 181.0 |
| Linolenic acid | $C_{18}$ | 3 | −11.2 | 273.5 |
| Bishomo-γ-linolenic acid | $C_{20}$ | 3 | About −10 | 248.5 |
| Arachidonic Acid | $C_{20}$ | 4 | −49.5 | 333.4 |
| Eicosa-pentaenoic acid | $C_{20}$ | 5 | −54.0 | 419.5 |

TABLE 1-continued

| Kind of fatty Acid | Carbon number | Number of double bond | Melting point (° C.) | Iodine value |
|---|---|---|---|---|
| Docosahexaenoic Acid | $C_{22}$ | 6 | −44.5 | 463.6 |

The preceding respective fatty acids given as examples can be obtained by hydrotically treating plant oils such as, for example, soybean oil, rapeseed oil, corn oil, safflower oil, sunflower oil, rice oil, beefsteak plant oil, evening primrose oil, borage oil and linseed oil, fish oils obtained from oceanic bonito, mackerel, sardine and tuna and fats and oils such as triglycerides originating in various microorganisms such as Conidiobolus genus of Entomophthorales. sp., Entomophthora genus, Mucor. sp. and Mortierella genus.

The fats and oils described above can be given as triglycerides containing the above fatty acids. Among these fats and oils, preferably used in the present invention are those having high contents of linoleic acid, linolenic acid, bishomo-γ-linolenic acid, arachidonic acid and eicosapentaenoic acid.

On the other hand, the metal salts of the above fatty acids are suitably calcium salts and magnesium salts of the various fatty acids described above, and they may be used alone or in combination of two or more kinds thereof. A production process of the metal salts of these fatty acids shall be explained later in details.

The breeding method of the present invention is preferably applied to female pigs bleeded by artificial insemination, and a feeding amount per day of at least one fatty acid selected from linoleic acid, linolenic acid, bishomo-γ-linolenic acid, arachidonic acid and eicosapentaenoic acid falls usually in a range of 20 to 200 g, preferably 30 to 180 g. The preceding feeding amount of less than 20 g does not allow the effects of these fatty acids to be sufficiently exhibited. On the other hand, the amount fed in excess of 200 g does not provide more effects and allows an adverse effect exerted by excess energy to grow large.

In the present invention, preferably used as the lipid described above are those containing at least one fatty acid selected from linoleic acid, linolenic acid, bishomo-γ-linolenic acid, arachidonic acid and eicosapentaenoic acid in a proportion of 20 to 99% by weight. If this content is less than 20% by weight, a large amount of the lipid has to be fed in order to feed at least one fatty acid selected from linoleic acid, linolenic acid, bishomo-γ-linolenic acid, arachidonic acid and eicosapentaenoic acid in an amount of 20 g or more per day. As a result thereof, the breeding efficiency is likely to be reduced because of a problem of excess growth brought about by excess energy, and a content of the other nutrients (carbohydrates, proteins and the like) is likely to be relatively reduced.

The triglycerides and fatty acids described above are liquid at a room temperature if linoleic acid, linolenic acid, bishomo-γ-linolenic acid, arachidonic acid or eicosapentaenoic acid is contained in a proportion of 20% by weight or more, but fatty acid calcium salts and fatty acid magnesium salts are solid. In terms of easiness in handling and easiness in admixing with a feed, these fatty acid metal salts are preferred among the lipids. In particular, solid powdery or granular fatty acid calcium salts and fatty acid magnesium salts are preferably used.

In the present invention, the triglycerides, fatty acids or fatty acid metal salts described above can be used in a mixture with conventional base feeds. Feeds which are usually available in the market for female pigs for propagation or fatting, for example, a feed having the following blending composition can be used as the base feed:

|  | % by weight |
| --- | --- |
| Bran | 50.0 |
| Milo | 21.2 |
| Soybean cake | 20.0 |
| Fish meal | 3.0 |
| Molasses | 4.0 |
| Minerals | 1.53 |
| Vitamines | 0.27 |

A blending proportion of the base feed to at least one lipid selected from the fatty acids described above, the triglycerides thereof and the metal salts of the above fatty acids is preferably decided so that at least one selected from linoleic acid, linolenic acid, bishomo-γ-linolenic acid, arachidonic acid and eicosapentaenoic acid is contained in a feed taken by a head per day in an amount of 20 to 200 g in terms of the fatty acid described above. In this case, the contents of linoleic acid, linolenic acid, bishomo-γ-linolenic acid, arachidonic acid or eicosapentaenoic acid contained in both of the base feed and the above lipid have to be considered, and they are controlled by the following method.

First of all, when the base feed is compounded with soybean, soybean cake, powdered blood and fish meal, there is a possibility that linoleic acid, linolenic acid, bishomo-γ-linolenic acid, arachidonic acid and eicosapentaenoic acid are contained as well in them, so that these base feeds are treated in advance with a solvent of chloroform/methanol= 2/1 to extract a lipid fraction, and this fraction has to be analyzed by a gas chromatography to determine a content of at least one selected from linoleic acid, linolenic acid, bishomo-γ-linolenic acid, arachidonic acid and eicosapentaenoic acid. Secondly, linoleic acid, linolenic acid, bishomo-γ-linolenic acid, arachidonic acid and eicosapentaenoic acid which are contained in the lipid described above are added to linoleic acid, linolenic acid, bishomo-γ-linolenic acid, arachidonic acid and eicosapentaenoic acid which are contained in this base feed to control the feeding amount so that the feeding amount comes to 20 to 200 g per day in terms of the fatty acid described above.

The feed intake amount per day is different depending on the breed of a pig used and falls in a range of about 2 to 4 kg per head. Considering, for example, a case where the feed intake amount is set at about 3.5 kg/day/head, it is assumed that analysis of the base feed described above shows a linoleic acid content of 10 g in 3.5 kg of the base feed. Accordingly, in this case, the lipid corresponding to 10 to 190 g of linoleic acid, linolenic acid, bishomo-γ-linolenic acid, arachidonic acid or eicosapentaenoic acid has to be added. Thus, blending 20 to 380 g of soybean oil having a linoleic acid content of 50% by weight with this base feed results in providing a feed having the intended composition. This feed may be used in the form of powder obtained merely by blending, a so-called mash type or may be used in a pelletized form obtained by means of a suitable extrusion-molding machine.

In the breeding method of the present invention, a duration of feeding female pigs with the feed described above extends from 30 days before artificial insemination up to 3 weeks after the artificial insemination. That is, the feed comprising the lipid containing at least one fatty acid selected from linoleic acid, linolenic acid, bishomo-γ-linolenic acid, arachidonic acid and eicosapentaenoic acid is fed in a duration extending from 30 days before artificial insemination up to 3 weeks after the artificial insemination. In this case, the feed is preferably fed in a proportion of 2 to 4 kg per head a day and 20 to 200 g per head a day in terms of the fatty acids described above. In the present invention, an amount corresponding to the amount achieved by feeding the feeding amount described above every day in the duration described above may be fed in any period in the duration described above, but taking the effects of the present invention into consideration, the amount described above is preferably fed every day in the duration described above. When the desired feeding amount is not achieved in the duration described above, the breeding result-improving effect becomes unsatisfactory, and therefore it is not preferred. In the present invention, the feed is preferably fed so that the total amount of the above fatty acid reaches 1500 to 9000 g per head.

The present invention provides a feed for a female pig for propagation (hereinafter referred to merely as [the feed of the present invention]).

The feed of the present invention comprises at least one lipid selected from a fatty acid having 12 to 24 carbon atoms which has a melting point falling in a range of −60 to 40° C., preferably −50 to 0° C. and an iodine value falling in a range of 30 to 470, preferably 150 to 470 and which has 2 to 6 double bonds in a molecule, a triglyceride containing the above fatty acid and a metal salt of the above fatty acid in a proportion of 0.5 to 10% by weight in terms of the fatty acid described above.

In the feed of the present invention, the fatty acid described above and the like have a content falling preferably in a range of 1 to 8% by weight, particularly suitably 1.1 to 6% by weight in terms of the fatty acid from the viewpoint of effectively feeding the feed. Preferably used as this fatty acid is at least one selected from linoleic acid, linolenic acid, bishomo-γ-linolenic acid, arachidonic acid and eicosapentaenoic acid.

Calcium salts and magnesium salts of the above fatty acids are preferred as the fatty acid metal salt. In particular, suited are fatty acid calcium salt and fatty acid magnesium salt containing at least one selected from linoleic acid, linolenic acid, bishomo-γ-linolenic acid, arachidonic acid and eicosapentaenoic acid in a proportion of 20 to 99% by weight. They may be used alone or in combination of two or more kinds thereof.

Among the lipids described above, these fatty acid metal salts are suited in terms of easiness in handling and easiness in admixing with the feed.

In the feeds of the present invention, particularly suited is the feed produced by blending the base feed with a metal salt of at least one fatty acid obtained by decomposing or refining soybean oil, corn oil, rapeseed oil, sunflower oil, safflower oil, sesame oil, rice oil, beefsteak plant oil, evening primrose oil, borage oil, linseed oil, palm oil or fish oil. Especially, preferred is the feed produced by blending a combination of the above metal salt with a triglyceride containing the fatty acid described above.

The metal salts of the fatty acids described above are produced by reacting the fatty acids with metal oxides or metal hydroxides, and preferred are those produced by means of an extruder having at least a raw material-feeding zone, a kneading and reacting zone and a cooling zone. Further, suited are those produced by controlling a temperature of the raw material-feeding zone in the extruder to 20 to 80° C., a temperature of the kneading and reacting zone to 80 to 200° C. and a temperature of the cooling zone to −20 to 5° C.

The extruder described above is a pressure extruder having a raw material-feeding zone, a reacting zone and a cooling zone, and capable of being used are those of a single shaft type in which one rotating screw is inserted into a cylinder and a two shaft type in which two screws rotating in the same direction or different directions are inserted into a cylinder, and having a cross section of an 8 character type. In particular, the extruder of a two shaft type is preferably used in the present invention in terms of a kneading capacity. The screw in this extruder of a two shaft type is used by suitably combining plural parts which can usually carry out operations such as delivering, reversing and kneading.

The cylinder part of this extruder is divided into plural barrels corresponding to a raw material-feeding zone, a kneading and reacting zone and a cooling zone, and external jackets are installed in the circumferences of the respective barrels, wherein a specification which can meet both heating and cooling can be employed so that the jackets can be applied to any of the zones described above by each barrel.

In the present invention, a temperature of a raw material-feeding site in the raw material-feeding zone is maintained at 20 to 80° C., preferably 30 to 70° C., and fatty acid, metal oxide or metal hydroxide and water are introduced to control a temperature of a kneading and reacting site in the kneading and reacting zone is maintained at 80 to 200° C., preferably 100 to 190° C. to react them to form a fatty acid metal salt. Further, a cooling site in the cooling zone is maintained in a range of −20 to 5° C., preferably −15 to 0° C. for cooling, whereby the desired fatty acid metal salt is advantageously produced.

Next, the present invention shall more specifically be explained with reference to examples, but the present invention shall by no means be restricted by these examples.

Preparation Example 1

The composition of a mixed feed used as a base feed is shown in Table 2.

TABLE 2

| Components | % by weight |
| --- | --- |
| Bran | 50.00 |
| Milo | 21.20 |
| Soybean cake | 20.00 |
| Fish meal | 3.00 |
| Molasses | 4.00 |
| Minerals | 1.53 |
| Vitamines | 0.27 |

Crude fat contained in this base feed was extracted and analyzed by a gas chromatography to find that contained in 1 kg were 2 g of linoleic acid, 1 g of linolenic acid and 1 g of eicosapentaenoic acid. Bishomo-γ-linolenic acid and arachidonic acid were not contained therein.

Triglycerides having a fatty acid composition shown in Table 3 were used to prepare mixed feeds in a composition shown in Table 4. The contents of linoleic acid, linolenic acid and eicosapentaenoic acid (hereinafter abbreviated as EPA) contained in the finished mixed feeds were shown as well in Table 4. The feeds thus obtained were designated as Samples 1 to 18.

TABLE 3

| | Fatty acid composition (% by weight) | | | | | |
| --- | --- | --- | --- | --- | --- | --- |
| Kind of fatty acid | Beef tallow hardened oil | Soybean oil | Sunflower oil | Safflower oil | Linseed oil | Borage oil |
| Myristic acid | 4.0 | — | — | — | — | 0.1 |
| Palmitic acid | 31.1 | 10.4 | 6.7 | 6.8 | 6.6 | 10.6 |
| Palmitoleic acid | 0.9 | — | — | — | — | 0.5 |
| Stearic acid | 60.0 | 4.0 | 4.0 | 2.5 | 2.9 | 4.0 |
| Oleic acid | 4.0 | 23.5 | 17.9 | 12.6 | 19.5 | 17.3 |
| Linoleic acid | | 53.5 | 69.8 | 77.4 | 23.4 | 37.1 |
| Linolenic acid | | 8.3 | 0.9 | 0.1 | 46.6 | 23.2 |
| Others | | 0.3 | 0.7 | 0.6 | 1.0 | 7.3 |

TABLE 4

| Sample No. | Triglyceride (g) | Base feed (kg) | Linoleic acid (g) | Linolenic acid (g) | EPA (g) |
| --- | --- | --- | --- | --- | --- |
| Sample 1 | Beef tallow hardened oil (50) | 3.45 | 6.90 | 3.45 | 3.45 |
| Sample 2 | Soybean oil (50) | 3.45 | 30.98 | 7.19 | 3.45 |

TABLE 4-continued

| Sample No. | Triglyceride (g) | Base feed (kg) | Linoleic acid (g) | Linolenic acid (g) | EPA (g) |
|---|---|---|---|---|---|
| Sample 3 | Sunflower oil (50) | 3.45 | 38.31 | 3.86 | 3.45 |
| Sample 4 | Safflower oil (50) | 3.45 | 41.73 | 3.50 | 3.45 |
| Sample 5 | Linseed oil (50) | 3.45 | 18.33 | 24.42 | 3.45 |
| Sample 6 | Borage oil (50) | 3.45 | 23.60 | 13.89 | 3.45 |
| Sample 7 | Beef tallow hardened oil (150) | 3.35 | 6.70 | 3.35 | 3.35 |
| Sample 8 | Soybean oil (150) | 3.35 | 78.93 | 14.56 | 3.35 |
| Sample 9 | Sunflower oil (150) | 3.35 | 103.60 | 4.57 | 3.35 |
| Sample 10 | Safflower oil (150) | 3.35 | 111.20 | 3.49 | 3.35 |
| Sample 11 | Linseed oil (150) | 3.35 | 37.39 | 66.26 | 3.35 |
| Sample 12 | Borage oil (150) | 3.35 | 56.79 | 34.67 | 3.35 |
| Sample 13 | Beef tallow hardened oil (250) | 3.25 | 6.50 | 3.25 | 3.25 |
| Sample 14 | Soybean oil (250) | 3.25 | 126.90 | 21.93 | 3.25 |
| Sample 15 | Sunflower oil (250) | 3.25 | 163.60 | 5.28 | 3.25 |
| Sample 16 | Safflower oil (250) | 3.25 | 180.70 | 3.48 | 3.25 |
| Sample 17 | Linseed oil (250) | 3.25 | 59.15 | 108.10 | 3.25 |
| Sample 18 | Borage oil (250) | 3.25 | 90.00 | 55.45 | 3.25 |

Preparation Example 2

Fatty acids having compositions shown in Table 5 were used to prepare mixed feeds having compositions shown in Table 6. The feed shown in Table 2 in Preparation Example 1 was used for the base feed. The feeds thus obtained were designated as Samples 19 to 39.

TABLE 5

| | Fatty acid composition (% by weight) | | | | | | |
|---|---|---|---|---|---|---|---|
| Kind of fatty acid | Beef tallow hardened oil fatty acid | Soybean oil fatty acid | Sunflower oil fatty acid | Safflower oil fatty acid | Extra α-Linolenic 70 | Linseed oil fatty acid | Borage oil fatty acid |
| Myristic acid | 4.0 | — | — | — | — | — | 0.1 |
| Palmitic acid | 31.1 | 10.4 | 6.7 | 6.8 | — | 6.6 | 10.6 |
| Palmitoleic acid | 0.9 | — | — | — | — | — | 0.5 |
| Stearic acid | 60.0 | 4.0 | 4.0 | 2.5 | — | 2.9 | 4.0 |
| Oleic acid | 4.0 | 23.5 | 17.9 | 12.6 | 4.0 | 19.5 | 17.3 |
| Linoleic acid | — | 53.5 | 69.8 | 77.4 | 22.5 | 23.4 | 37.1 |
| Linolenic acid | — | 8.3 | 0.9 | 0.1 | 73.5 | 46.6 | 23.2 |
| Others | — | 0.3 | 0.7 | 0.6 | — | 1.0 | 7.3 |

TABLE 6

| Sample No. | Fatty acid (g) | Base feed (kg) | Linoleic acid (g) | Linolenic Acid (g) | EPA (g) |
|---|---|---|---|---|---|
| Sample 19 | Beef tallow hardened oil (50) | 3.45 | 6.90 | 3.45 | 3.45 |
| Sample 20 | Soybean oil (50) | 3.45 | 33.65 | 7.60 | 3.45 |
| Sample 21 | Sunflower oil (50) | 3.45 | 41.80 | 8.90 | 3.45 |
| Sample 22 | Safflower oil (50) | 3.45 | 45.60 | 3.50 | 3.45 |
| Sample 23 | Extra α-Linolenic 70 (50) | 3.45 | 18.15 | 40.20 | 3.45 |
| Sample 24 | Linseed oil (50) | 3.45 | 19.60 | 26.75 | 3.45 |
| Sample 25 | Borage oil (50) | 3.45 | 25.45 | 15.05 | 3.45 |
| Sample 26 | Beef tallow hardened oil (150) | 3.35 | 6.70 | 3.35 | 3.35 |
| Sample 27 | Soybean oil (150) | 3.35 | 86.95 | 15.80 | 3.35 |
| Sample 28 | Sunflower oil (150) | 3.35 | 114.40 | 4.70 | 3.35 |
| Sample 29 | Safflower oil (150) | 3.35 | 122.80 | 3.50 | 3.35 |
| Sample 30 | Extra α-Linolenic 70 (150) | 3.35 | 40.45 | 113.60 | 3.35 |
| Sample 31 | Linseed oil (150) | 3.35 | 41.80 | 73.25 | 3.35 |
| Sample 32 | Borage oil (150) | 3.35 | 62.35 | 38.15 | 3.35 |
| Sample 33 | Beef tallow hardened oil (250) | 3.25 | 6.50 | 3.25 | 3.25 |
| Sample 34 | Soybean oil (250) | 3.25 | 140.30 | 24.00 | 3.25 |
| Sample 35 | Sunflower oil (250) | 3.25 | 181.00 | 5.50 | 3.25 |
| Sample 36 | Safflower oil (250) | 3.25 | 200.00 | 3.50 | 3.25 |
| Sample 37 | Extra α-Linolenic 70 (250) | 3.25 | 62.75 | 187.00 | 3.25 |
| Sample 38 | Linseed oil (250) | 3.25 | 65.00 | 119.75 | 3.25 |
| Sample 39 | Borage oil (250) | 3.25 | 99.25 | 61.25 | 3.25 |

Preparation Example 3

Used were seven kinds of beef tallow hardened oil fatty acid, sunflower oil fatty acid, soybean oil fatty acid, safflower oil fatty acid, linseed oil fatty acid, Extra α-Linolenic 70 and borage oil fatty acid in a composition shown in Table 5 (all manufactured by NOF Corporation) to prepare fatty acid calcium salts by the following method.

Added to a reactor charged with 400 kg of water was 20 kg of fine powder-like calcium hydroxide (a product of Inoue Lime Co., Ltd.), and it was well stirred and dispersed. Dropwise added to the reactor in 30 minutes while stirring was 100 kg of fatty acid which was heated in advance to 60° C. to carry out neutralization. After finishing dropwise adding, the solution was stirred and ripened for one hour and then filtered to collect fatty acid calcium salt. This filtered matter was dried by hot air at 80° C. for 3 hours to obtain each 120 kg of the respective fatty acid calcium salts. Seven kinds of the fatty acid calcium salts thus obtained were used to obtain samples in compositions shown in Table 7, and they were designated as Samples 40 to 60. The feed shown in Table 2 in Preparation Example 1 was used for the base feed.

TABLE 7

| Sample No. | Fatty acid calcium salt (g) | Base feed (kg) | Linoleic acid (g) | Linolenic Acid (g) | EPA (g) |
|---|---|---|---|---|---|
| Sample 40 | Beef tallow hardened oil (50) | 3.45 | 6.90 | 3.45 | 3.45 |

TABLE 7-continued

| Sample No. | Fatty acid calcium salt (g) | Base feed (kg) | Linoleic acid (g) | Linolenic Acid (g) | EPA (g) |
|---|---|---|---|---|---|
| Sample 41 | Soybean oil (50) | 3.45 | 30.98 | 7.19 | 3.45 |
| Sample 42 | Sunflower oil (50) | 3.45 | 38.31 | 3.86 | 3.45 |
| Sample 43 | Safflower oil (50) | 3.45 | 41.73 | 3.50 | 3.45 |
| Sample 44 | Extra α-Linolenic 70 (50) | 3.45 | 17.03 | 36.53 | 3.45 |
| Sample 45 | Linseed oil (50) | 3.45 | 18.33 | 24.42 | 3.45 |
| Sample 46 | Borage oil (50) | 3.45 | 23.60 | 13.89 | 3.45 |
| Sample 47 | Beef tallow hardened oil (150) | 3.35 | 6.70 | 3.35 | 3.35 |
| Sample 48 | Soybean oil (150) | 3.35 | 78.93 | 14.56 | 3.35 |
| Sample 49 | Sunflower oil (150) | 3.35 | 103.60 | 4.57 | 3.35 |
| Sample 50 | Safflower oil (150) | 3.35 | 111.20 | 3.49 | 3.35 |
| Sample 51 | Extra α-Linolenic 70 (150) | 3.35 | 37.08 | 102.6 | 3.35 |
| Sample 52 | Linseed oil (150) | 3.35 | 37.39 | 66.26 | 3.35 |
| Sample 53 | Borage oil (150) | 3.35 | 56.79 | 24.67 | 3.35 |
| Sample 54 | Beef tallow hardened oil (250) | 3.25 | 6.50 | 3.25 | 3.25 |
| Sample 55 | Soybean oil (250) | 3.25 | 126.90 | 21.93 | 3.25 |
| Sample 56 | Sunflower oil (250) | 3.25 | 163.60 | 5.28 | 3.25 |
| Sample 57 | Safflower oil (250) | 3.25 | 180.70 | 3.48 | 3.25 |
| Sample 58 | Extra α-Linolenic 70 (250) | 3.25 | 57.13 | 168.60 | 3.25 |
| Sample 59 | Linseed oil (250) | 3.25 | 59.15 | 108.10 | 3.25 |
| Sample 60 | Borage oil (250) | 3.25 | 90.00 | 55.45 | 3.25 |

Preparation Example 4

Fatty acids having fatty acid compositions shown in Table 8 were used to prepare mixed feeds in compositions shown in Table 9. The feed shown in Table 2 in Preparation Example 1 was used for the base feed. Shown in Table 9 were the contents of linoleic acid, linolenic acid, bishomo-γ-linolenic acid, arachidonic acid and eicosapentaenoic acid (EPA) contained in the finished mixed feeds. The feeds thus obtained were designated as Samples 61 to 72. Extra Bishomo-γ-Linolenic 90, Extra Arachidonic 90 and Extra EPA 90 each shown in Table 8 are products of NOF Corporation.

TABLE 8

| | Fatty acid composition (% by weight) | | | |
|---|---|---|---|---|
| Kind of fatty acid | Beef tallow hardened oil | Extra Bishomo-γ-Linolenic 90 | Extra Arachidonic 90 | Extra EPA 90 |
| Myristic acid | 4.0 | — | — | — |
| Palmitic acid | 31.1 | — | — | — |
| Palmitoleic acid | 0.9 | — | — | — |
| Stearic acid | 60.0 | — | — | — |
| Oleic acid | 4.0 | — | — | — |
| Linoleic acid | — | — | — | — |
| Linolenic acid | — | 5.1 | — | — |
| Bishomo-γ-linolenic acid | — | 93.5 | 5.5 | — |
| Arachidonic acid | — | 1.4 | 93.3 | — |
| Eicosapentaenoic acid | — | — | — | 92.9 |
| Docosahexaenoic acid | — | — | — | 5.9 |
| Others | — | — | 1.2 | 1.2 |

TABLE 9

| Sample No. | Fatty acid (g) | Base feed (kg) | Linoleic acid (g) | Linolenic acid (g) | BHGLN*1 (g) | Arachidonic acid (g) | EPA (g) |
|---|---|---|---|---|---|---|---|
| Sample 61 | Beef tallow hardened oil (50) | 3.45 | 6.9 | 3.45 | 0 | 0 | 3.45 |
| Sample 62 | EBLN-90*2 (50) | 3.45 | 6.9 | 6.0 | 46.75 | 0.7 | 3.45 |
| Sample 63 | EAA-90*3 (50) | 3.45 | 6.9 | 3.45 | 2.75 | 46.55 | 3.45 |
| Sample 64 | EEPA-90*4 (50) | 3.45 | 6.9 | 3.45 | 0 | 0 | 49.9 |
| Sample 65 | Beef tallow hardened oil (150) | 3.35 | 6.7 | 3.35 | 0 | 0 | 3.35 |
| Sample 66 | EBLN-90*2 (150) | 3.35 | 6.7 | 11.0 | 140.3 | 2.1 | 3.35 |
| Sample 67 | EAA-90*3 (150) | 3.35 | 6.7 | 3.35 | 8.25 | 140.0 | 3.35 |
| Sample 68 | EEPA-90*4 (150) | 3.35 | 6.7 | 3.35 | 0 | 0 | 142.7 |
| Sample 69 | Beef tallow hardened oil (200) | 3.30 | 6.6 | 3.3 | 0 | 0 | 3.3 |
| Sample 70 | EBLN-90*2 (200) | 3.30 | 6.6 | 13.5 | 187 | 2.8 | 3.3 |
| Sample 71 | EAA-90*3 (200) | 3.30 | 6.6 | 3.3 | 11.0 | 186.6 | 3.3 |
| Sample 72 | EEPA-90*4 (200) | 3.30 | 6.6 | 3.3 | 0 | 0 | 189.1 |

*1: abbreviation of bishomo-γ-linolenic acid
*2: abbreviation of Extra Bishomo-γ-Linolenic 90
*3: abbreviation of Extra Arachidonic 90
*4: abbreviation of Extra EPA 90

Preparation Example 5

Four kinds of beef tallow fatty acid, Extra Bishomo-γ-Linolenic 90, Extra Arachidonic 90 and Extra EPA 90 each having compositions shown in Table 8 were used to prepare four kinds of fatty acid calcium salts according to the method used in Preparation Example 3. These fatty acid calcium salts were used to prepare feeds in compositions shown in Table 10. The feeds thus obtained were designated as Samples 73 to 84. The feed shown in Table 2 in Preparation Example 1 was used for the base feed.

TABLE 10

| Sample No. | Fatty acid (g) | Base feed (kg) | Linoleic acid (g) | Linolenic acid (g) | BHGLN[*1] (g) | Arachidonic acid (g) | EPA (g) |
| --- | --- | --- | --- | --- | --- | --- | --- |
| Sample 73 | Beef tallow hardened oil (50) | 3.45 | 6.9 | 3.45 | 0 | 0 | 3.45 |
| Sample 74 | EBLN-90[*2] (50) | 3.45 | 6.9 | 5.75 | 42.1 | 0.63 | 3.45 |
| Sample 75 | EAA-90[*3] (50) | 3.45 | 6.9 | 3.45 | 2.48 | 42.0 | 3.45 |
| Sample 76 | EEPA-90[*4] (50) | 3.45 | 6.9 | 3.45 | 0 | 0 | 45.26 |
| Sample 77 | Beef tallow hardened oil (150) | 3.35 | 6.7 | 3.35 | 0 | 0 | 3.35 |
| Sample 78 | EBLN-90[*2] (150) | 3.35 | 6.7 | 10.33 | 126.2 | 1.89 | 3.35 |
| Sample 79 | EAA-90[*3] (150) | 3.35 | 6.7 | 3.35 | 7.43 | 126.0 | 3.35 |
| Sample 80 | EEPA-90[*4] (150) | 3.35 | 6.7 | 3.35 | 0 | 0 | 128.8 |
| Sample 81 | Beef tallow hardened oil (250) | 3.25 | 6.5 | 3.25 | 0 | 0 | 3.25 |
| Sample 82 | EBLN-90[*2] (250) | 3.25 | 6.5 | 13.45 | 168.3 | 2.52 | 3.25 |
| Sample 83 | EAA-90[*3] (250) | 3.25 | 6.5 | 3.25 | 9.9 | 167.9 | 3.25 |
| Sample 84 | EEPA-90[*4] (250) | 3.25 | 6.5 | 3.25 | 0 | 0 | 170.5 |

[*1]: abbreviation of bishomo-γ-linolenic acid
[*2]: abbreviation of Extra Bishomo-γ-Linolenic 90
[*3]: abbreviation of Extra Arachidonic 90
[*4]: abbreviation of Extra EPA 90

Production Examples 1 to 4

Four kinds of soybean oil fatty acid, Extra EPA 90, Extra α-Linolenic 70 and safflower oil fatty acid each having compositions shown in Table 11 were used to produce fatty acid metal salts by means of an extruder.

TABLE 11

| | Fatty acid composition (% by weight) | | | |
| --- | --- | --- | --- | --- |
| Kind of fatty acid | Soybean oil fatty acid | Extra EPA 90 | Extra α-Linolenic 70 | Safflower oil fatty acid |
| Myristic acid | — | — | — | — |
| Palmitic acid | 10.4 | — | — | 6.8 |
| Palmitoleic acid | — | — | — | — |
| Stearic acid | 4.0 | — | — | 2.5 |
| Oleic acid | 23.5 | — | 4.0 | 12.6 |
| Linoleic acid | 53.5 | — | 22.5 | 77.4 |
| Linolenic acid | 8.3 | — | 73.5 | 0.1 |
| Eicosapentaenoic acid | — | 92.9 | — | — |
| Docosahexaenoic acid | — | 5.9 | — | — |
| Others | — | 1.2 | — | — |

(all manufactured by Nippon Fat & Oil Co., Ltd.)

Production Example 1

Soybean oil fatty acid (melting point: −2° C.) and calcium hydroxide which were heated in advance at 40° C. were fed at a rate of 100 kg/hr and 20 kg/hr respectively from a raw material-feeding port in the first barrel of an EA-100 type extruder (manufactured by Suehiro EPM Co., Ltd.). Water was fed at a rate of 3 kg/hr from a charging port present at an upper part of the first barrel. Set respectively were a temperature of jackets in the first and second barrels (raw material-feeding parts) at 70° C., a temperature of jackets in the third and fourth barrels (kneading and reacting part) at 180° C. and a temperature of jackets in the fifth and sixth barrels (cooling part) at −10° C. to carry out continuous reaction at a screw revolution of 120 rounds/minute for 5 hours. After finishing the reaction, a fatty acid calcium salt product was obtained at a reactivity, an amount and a yield each shown in Table 12.

Production Example 2

The reaction was carried out in the same manner as in Production Example 1, except that substituted were Extra EPA90 (melting point: −44° C., manufactured by NOF Corporation) for soybean oil fatty acid and magnesium hydroxide of 16 kg/hr for calcium hydroxide of 20 kg/hr and that a screw revolution of 120 rounds/minute was changed to 100 rounds/minute. After finishing the reaction, a fatty acid magnesium salt product was obtained at a reactivity, an amount and a yield each shown in Table 12.

Production Example 3

The reaction was carried out in the same manner as in Production Example 1, except that substituted were Extra α-Linolenic 70 (melting point: −25° C., manufactured by NOF Corporation) for soybean oil fatty acid and magnesium hydroxide of 13 kg/hr for calcium hydroxide of 20 kg/hr and that a temperature of the jackets in the third and fourth barrels (kneading and reacting part) was changed from 180° C. to 100° C. and a temperature of the jackets in the fifth and sixth barrels (cooling part) was changed from −10° C. to −5° C. After finishing the reaction, a fatty acid magnesium salt product was obtained at a reactivity, an amount and a yield each shown in Table 12.

Production Example 4

The reaction was carried out in the same manner as in Production Example 1, except that safflower oil fatty acid (melting point: −15° C.) was substituted for soybean oil fatty acid and that a temperature of the jackets in the third and fourth barrels (kneading and reacting part) was changed from 180° C. to 160° C. After finishing the reaction, a fatty acid calcium salt product was obtained at a reactivity, an amount and a yield each shown in Table 12.

TABLE 12

|  | Production Example | | | |
| --- | --- | --- | --- | --- |
|  | 1 | 2 | 3 | 4 |
| Kind of fatty acid | Soybean oil fatty acid | Extra EPA90 | Extra α-Linolenic 70 | Safflower oil fatty acid |
| Kind of metal | Calcium | Magnesium | Magnesium | Calcium |
| Amount (kg) | 557 | 566 | 570 | 557 |
| Yield (%) | 98.0 | 97.0 | 98.0 | 98.0 |
| Reactivity (%) | 99.9 | 99.8 | 99.7 | 99.5 |

Production Example 6

Four kinds of the fatty acid metal salts obtained in Production Examples 1 to 4 were mixed with the base feed by the use of a ribbon mixer in compositions shown in Table 13 to prepare mixed feeds. The feed shown in Table 2 in Preparation Example 1 was used for the base feed. The feeds thus obtained were designated as Samples 85 to 92. Shown in Table 13 were the contents of linoleic acid, linolenic acid and eicosapentaenoic acid (EPA) contained in the mixed feeds.

TABLE 13

| Sample No. | Fatty acid metal salt (g) | Base feed (kg) | Linoleic acid (g) | Linolenic acid | EPA (g) |
| --- | --- | --- | --- | --- | --- |
| Sample 85 | Soybean oil fatty acid calcium salt (50) | 3.45 | 30.98 | 7.19 | 3.45 |
| Sample 86 | Extra EPA90 fatty acid magnesium salt (50) | 3.45 | 6.90 | 3.45 | 47.11 |
| Sample 87 | Extra α-Linolenic 70 fatty acid magnesium salt (50) | 3.45 | 17.48 | 38.00 | 3.45 |
| Sample 88 | Safflower oil fatty acid calcium salt (50) | 3.45 | 41.73 | 3.50 | 3.45 |
| Sample 89 | Soybean oil fatty acid calcium salt (150) | 3.35 | 78.93 | 14.56 | 3.35 |
| Sample 90 | Extra EPA90 fatty acid magnesium salt (150) | 3.35 | 6.70 | 3.35 | 134.3 |
| Sample 91 | Extra α-Linolenic 70 fatty acid magnesium salt (150) | 3.35 | 38.43 | 107.0 | 3.35 |
| Sample 92 | Safflower oil fatty acid calcium salt (150) | 3.35 | 111.2 | 3.49 | 3.35 |

EXAMPLE 1

Divided into 18 groups by every 20 head were 360 head of Land Race Yorkshire genus female pigs having an average body weight of 170 kg. In a duration extending from 30 days before artificial insemination up to 3 weeks after the artificial insemination, each of Samples 1 to 18 was fed to each group in an amount of 3.5 kg per head a day. Sperms of Dirac genus were fertilized by artificial insemination, and then 3.5 kg per head a day on the average of Sample 1 was fed during a pregnant duration. In the subsequent delivery, determined were a litter size, average days of returning estrus and an average number of delactation of each group (20 head). The results thereof are shown in table 14.

TABLE 14

|  | Litter size (head) | Average days of returning estrus (day) | Average number of delactation (head) |
| --- | --- | --- | --- |
| Sample 1 | 11.5 | 12.2 | 9.5 |
| Sample 2 | 13.5 | 6.8 | 11.9 |
| Sample 3 | 14.8 | 5.7 | 13.0 |
| Sample 4 | 14.7 | 5.5 | 12.9 |
| Sample 5 | 14.7 | 5.6 | 13.0 |
| Sample 6 | 14.5 | 5.5 | 13.0 |
| Sample 7 | 12.0 | 11.8 | 10.2 |
| Sample 8 | 14.3 | 6.3 | 12.6 |
| Sample 9 | 14.9 | 5.8 | 13.1 |
| Sample 10 | 15.0 | 5.8 | 13.2 |
| Sample 11 | 15.3 | 5.9 | 13.2 |
| Sample 12 | 15.2 | 5.5 | 13.1 |
| Sample 13 | 12.0 | 11.7 | 10.2 |
| Sample 14 | 14.6 | 6.0 | 12.8 |
| Sample 15 | 15.5 | 5.5 | 13.6 |
| Sample 16 | 15.7 | 5.5 | 13.9 |
| Sample 17 | 15.5 | 5.6 | 13.6 |
| Sample 18 | 15.4 | 5.5 | 13.7 |

Among Samples 1 to 18 used in the present example, only Samples 1, 7 and 13 each had linoleic acid, linolenic acid and eicosapentaenoic acid (EPA) contents of less than 20 g. The respective groups fed with the feeds compounded with any of soybean oil, sunflower oil, safflower oil, linseed oil and borage oil showed good breeding results in all of the three items as compared with those of the groups fed with Samples 1, 7 and 13 compounded with beef tallow hardened oil. That is, the feeds compounded with triglycerides containing linoleic acid and linolenic acid were improved in breeding results.

EXAMPLE 2

The feeding test was carried out in the same manner as in Example 1, except that the number of the female pigs was changed from 360 head to 420 head and 18 groups were changed to 21 groups. The 21 groups each were fed with each of Samples 19 to 39. The results thereof are shown in table 15.

TABLE 15

|  | Litter size (head) | Average days of returning estrus (day) | Average number of delactation (head) |
| --- | --- | --- | --- |
| Sample 19 | 11.6 | 12.3 | 9.7 |
| Sample 20 | 13.8 | 6.6 | 12.0 |
| Sample 21 | 14.3 | 6.0 | 12.4 |
| Sample 22 | 14.5 | 6.1 | 12.6 |
| Sample 23 | 14.5 | 6.1 | 12.7 |
| Sample 24 | 14.6 | 6.1 | 12.8 |
| Sample 25 | 14.6 | 6.2 | 12.7 |
| Sample 26 | 11.9 | 12.1 | 9.9 |
| Sample 27 | 14.8 | 6.0 | 12.8 |
| Sample 28 | 15.2 | 5.7 | 13.4 |
| Sample 29 | 15.4 | 5.7 | 13.6 |
| Sample 30 | 15.6 | 5.6 | 13.6 |
| Sample 31 | 15.6 | 5.6 | 13.8 |
| Sample 32 | 15.5 | 5.6 | 13.7 |
| Sample 33 | 12.0 | 12.0 | 10.1 |
| Sample 34 | 15.0 | 5.9 | 13.0 |
| Sample 35 | 16.4 | 5.4 | 14.5 |
| Sample 36 | 16.5 | 5.4 | 14.7 |
| Sample 37 | 16.3 | 5.4 | 14.5 |
| Sample 38 | 16.5 | 5.5 | 14.8 |
| Sample 39 | 16.3 | 5.7 | 14.5 |

Among Samples 19 to 39 used in the present example, all of Samples 19, 26 and 33 each had linoleic acid, linolenic acid and eicosapentaenoic acid (EPA) contents of 20 g or less. The respective groups fed with the samples compounded with soybean oil fatty acid, sunflower oil fatty acid, safflower oil fatty acid, Extra α-Linolenic 70, linseed oil fatty acid and borage oil fatty acid showed good breeding results in all of the three items as compared with those of the groups fed with Samples 19, 26 and 33 compounded with beef tallow hardened oil fatty acid. That is, the samples compounded with linoleic acid and linolenic acid were improved in breeding results.

EXAMPLE 3

The feeding test was carried out in the same manner as in Example 2, except that each of the 21 groups was fed with Samples 40 to 60 in place of Samples 19 to 39. The results thereof are shown in table 16.

TABLE 16

|  | Litter size (head) | Average days of returning estrus (day) | Average number of delactation (head) |
| --- | --- | --- | --- |
| Sample 40 | 11.8 | 12.5 | 9.9 |
| Sample 41 | 14.0 | 6.5 | 12.1 |
| Sample 42 | 14.8 | 6.0 | 13.0 |

TABLE 16-continued

|  | Litter size (head) | Average days of returning estrus (day) | Average number of delactation (head) |
| --- | --- | --- | --- |
| Sample 43 | 14.9 | 6.0 | 13.2 |
| Sample 44 | 14.8 | 6.1 | 13.0 |
| Sample 45 | 14.9 | 6.1 | 13.3 |
| Sample 46 | 14.8 | 6.0 | 13.1 |
| Sample 47 | 12.1 | 12.3 | 10.1 |
| Sample 48 | 14.3 | 6.1 | 12.3 |
| Sample 49 | 15.2 | 5.8 | 13.4 |
| Sample 50 | 15.5 | 5.6 | 13.7 |
| Sample 51 | 15.5 | 5.5 | 13.8 |
| Sample 52 | 15.4 | 5.5 | 13.8 |
| Sample 53 | 15.5 | 5.6 | 13.8 |
| Sample 54 | 12.3 | 12.2 | 10.2 |
| Sample 55 | 14.8 | 6.0 | 12.9 |
| Sample 56 | 16.0 | 5.8 | 14.3 |
| Sample 57 | 16.1 | 5.5 | 14.4 |
| Sample 58 | 16.1 | 5.4 | 14.4 |
| Sample 59 | 16.3 | 5.5 | 14.5 |
| Sample 60 | 16.3 | 5.4 | 14.7 |

Among Samples 40 to 60 used in the present example, Samples 40, 47 and 54 each had linoleic acid, linolenic acid and EPA contents of 20 g or less. The respective groups fed with the samples compounded with fatty acid calcium salts comprising soybean oil fatty acid, sunflower oil fatty acid, safflower oil fatty acid, Extra α-Linolenic 70, linseed oil fatty acid or borage oil fatty acid showed good breeding results in all of the three items as compared with those of the groups fed with Samples 40, 47 and 54 compounded with calcium salt of fatty acid contained in beef tallow hardened oil. That is, the samples compounded with fatty acid calcium salts containing linoleic acid and linolenic acid were improved in breeding results.

EXAMPLE 4

The feeding test was carried out in the same manner as in Example 1, except that the number of the female pigs was changed from 360 head to 240 head and 18 groups were changed to 12 groups. The 12 groups each were fed with each of Samples 61 to 72. The results thereof are shown in table 17.

TABLE 17

|  | Litter size (head) | Average days of returning estrus (day) | Average number of delactation (head) |
| --- | --- | --- | --- |
| Sample 61 | 11.5 | 12.2 | 9.5 |
| Sample 62 | 14.6 | 6.3 | 13.1 |
| Sample 63 | 14.8 | 6.0 | 13.3 |
| Sample 64 | 14.8 | 6.0 | 13.2 |
| Sample 65 | 12.0 | 12.2 | 10.5 |
| Sample 66 | 15.4 | 5.7 | 13.9 |
| Sample 67 | 15.3 | 5.7 | 13.9 |
| Sample 68 | 15.6 | 5.5 | 13.8 |
| Sample 69 | 12.6 | 12.4 | 10.5 |
| Sample 70 | 16.0 | 5.4 | 14.4 |
| Sample 71 | 16.1 | 5.7 | 14.4 |
| Sample 72 | 16.2 | 5.6 | 14.6 |

Among Samples 61 to 72 used in the present example, Samples 61, 65 and 69 each had linoleic acid, linolenic acid, bishomo-γ-linolenic acid, arachidonic acid and EPA contents of 20 g or less. The respective groups fed with the samples compounded with Extra Bishomo-γ-Linolenic 90, Extra Arachidonic 90 and Extra EPA 90 showed good breeding results in all of the three items as compared with those of the groups fed with Samples 61, 65 and 69 compounded with beef tallow hardened oil fatty acid. That is, the samples compounded with fatty acids containing bishomo-γlinolenic acid, arachidonic acid and EPA were improved in breeding results.

EXAMPLE 5

The feeding test was carried out in the same manner as in Example 1, except that the number of the female pigs was changed from 360 head to 400 head and 18 groups were changed to 20 groups and that the 20 groups each were fed with each of Samples 73 to 92. The results thereof are shown in table 18.

TABLE 18

|  | Litter size (head) | Average days of returning estrus (day) | Average number of delactation (head) |
|---|---|---|---|
| Sample 73 | 11.3 | 12.5 | 9.5 |
| Sample 74 | 14.8 | 6.8 | 13.3 |
| Sample 75 | 14.7 | 6.3 | 13.3 |
| Sample 76 | 14.6 | 6.1 | 13.5 |
| Sample 77 | 12.0 | 12.3 | 10.5 |
| Sample 78 | 15.5 | 5.7 | 13.8 |
| Sample 79 | 15.1 | 5.9 | 13.9 |
| Sample 80 | 15.6 | 5.7 | 13.9 |
| Sample 81 | 12.6 | 12.2 | 10.5 |
| Sample 82 | 16.1 | 5.5 | 14.5 |
| Sample 83 | 16.2 | 5.7 | 14.6 |
| Sample 84 | 16.3 | 5.5 | 14.6 |
| Sample 85 | 14.2 | 6.4 | 12.3 |
| Sample 86 | 14.3 | 6.3 | 13.2 |
| Sample 87 | 14.6 | 6.1 | 13.1 |
| Sample 88 | 14.8 | 6.0 | 13.2 |
| Sample 89 | 14.5 | 6.0 | 12.5 |
| Sample 90 | 15.4 | 5.8 | 13.6 |
| Sample 91 | 15.3 | 5.6 | 13.7 |
| Sample 92 | 15.6 | 5.5 | 13.8 |

Among Samples 73 to 92 used in the present example, Samples 73, 77 and 81 each had linoleic acid, linolenic acid, bishomo-γ-linolenic acid, arachidonic acid and EPA contents of 20 g or less. The respective groups fed with the samples compounded with Extra Bishomo-γ-Linolenic 90 fatty acid calcium salt, Extra Arachidonic 90 fatty acid calcium salt, soybean oil fatty acid calcium salt, Extra EPA 90 fatty acid calcium salt and fatty acid magnesium salt, Extra α-Linolenic 70 fatty acid calcium salt and safflower oil fatty acid calcium salt showed good breeding results in all of the three items as compared with those of the groups fed with Samples 73, 77 and 81 compounded with beef tallow hardened oil fatty acid calcium salt.

INDUSTRIAL APPLICABILITY

According to the present invention, fed are a fatty acid having 12 to 24 carbon atoms which has a melting point falling in a range of −60 to 40° C. and an iodine value falling in a range of 30 to 470 and which has 2 to 6 double bonds in a molecule, triglyceride containing the above fatty acid and a metal salt of the above fatty acid which assume an important part in breeding, whereby breeding results can be elevated by shortening the days of returning estrus and increasing a litter size and the number of delactation. Accordingly, a productivity of young pigs is improved to a large extent, which brings about industrial advantages.

What is claimed is:

1. A breeding method of a female pig for propagation by artificial insemination, characterized by feeding to the female pig a feed comprising at least one lipid selected from a fatty acid having 12 to 24 carbon atoms which has a melting point falling in a range of −60 to 40° C. and an iodine value falling in a range of 30 to 470 and which has 2 to 6 double bonds in a molecule, a triglyceride containing the above fatty acid and a metal salt of the above fatty acid, in a proportion of 20 to 200 g per head a day in terms of the fatty acid described above in a duration extending from 30 days before the artificial insemination up to 3 weeks after the artificial insemination.

2. The breeding method as described in claim 1, wherein said lipid includes the metal salt of the fatty acid having 12 to 24 carbon atoms which has a melting point falling in a range of −60 to 40° C. and an iodine value falling in a range of 30 to 470 and which has 2 to 6 double bonds in a molecule.

3. The method as described in claim 2, wherein the feed further comprises as a lipid, a triglyceride containing a fatty acid having 12 to 24 carbon atoms which has a melting point falling in a range of −60 to 40° C. and an iodine value falling in a range of 30 to 470 and which has 2 to 6 double bonds in a molecule.

4. The method as described in claim 1, wherein the fatty acid is at least one selected from linoleic acid, linolenic acid, bishomo-γ-linolenic acid, arachidonic acid and eicosapentaenoic acid.

5. The method as described in claim 1, wherein the metal salt of a fatty acid is at least one selected from a calcium salt and a magnesium salt of the fatty acid.

6. The method as described in claim 1, wherein the feed comprising a lipid containing at least one fatty acid selected from linoleic acid, linolenic acid, bishomo-γ-linolenic acid, arachidonic acid and eicosapentaenoic acid is fed so that the total amount of the fatty acid described above comes to 1500 to 9000 g per head in terms of the fatty acid described above in a duration extending from 30 days before artificial insemination up to 3 weeks after the artificial insemination.

7. The method as described in claim 6, wherein the feed contains at least one fatty acid selected from linoleic acid, linolenic acid, bishomo-γ-linolenic acid, arachidonic acid and eicosapentaenoic acid in a lipid in a proportion of 20 to 99% by weight.

8. The method as described in claim 2, wherein the metal salt of a fatty acid is at least one selected from a calcium salt and a magnesium salt of the fatty acid.

9. The method as described in claim 1, wherein the feed contains at least one fatty acid selected from linoleic acid, linolenic acid, bishomo-γ-linolenic acid, arachidonic acid and eicosapentaenoic acid in a lipid in a proportion of 20 to 99% by weight.

10. The method as described in claim 1, wherein said feed is fed in a proportion of 30 to 180 g per head a day in terms of the fatty acid.

* * * * *